No. 805,913. PATENTED NOV. 28, 1905.
H. R. HILL.
PIPE TONGS.
APPLICATION FILED SEPT. 8, 1905.
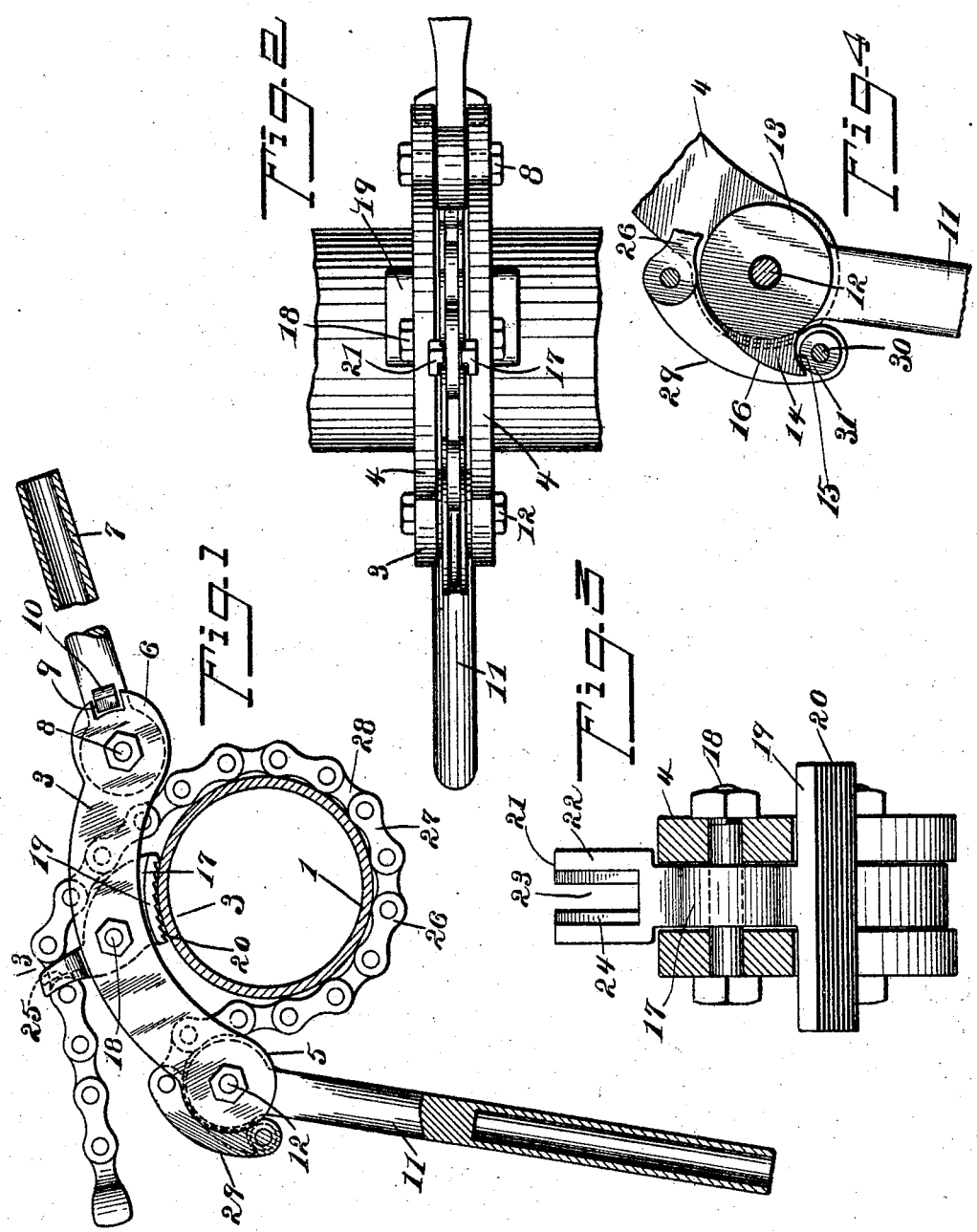
WITNESSES:
INVENTOR
Henry R. Hill.
BY
ATTORNEYS

UNITED STATES PATENT OFFICE.

HENRY R. HILL, OF CALDWELL, OHIO.

PIPE-TONGS.

No. 805,913.  Specification of Letters Patent.  Patented Nov. 28, 1905.

Application filed September 8, 1905. Serial No. 277,542.

*To all whom it may concern:*

Be it known that I, HENRY R. HILL, a citizen of the United States, and a resident of Caldwell, in the county of Noble and State of Ohio, have invented a new and Improved Pipe-Tongs, of which the following is a full, clear, and exact description.

This invention relates to pipe tongs or wrenches, and especially to such tongs as are used in oil regions for screwing and unscrewing sections of oil pipes or casings.

The object of the invention is to produce a device of this class which is simple in construction and which will operate to apply a powerful gripping force to the pipe when the lever of the tongs is used to produce the desired rotation of the pipe.

The invention consists in the construction and combination of parts to be more fully described hereinafter and definitely set forth in the claims.

Reference is to be had to the accompanying drawings, forming a part of this specification, in which similar characters of reference indicate corresponding parts in all the views.

Figure 1 is a cross-section through a pipe and representing the tongs as applied thereto, portions of the tongs being represented as broken away, as will appear. Fig. 2 is an elevation showing a short section of the pipe and showing the tongs in edge view. Fig. 3 is a section upon an enlarged scale and taken substantially upon the line 3 3 of Fig. 1, the pipe being removed; and Fig. 4 is a plan showing a portion of the tongs in detail and upon an enlarged scale, certain parts being represented in section and others broken away.

Referring more particularly to the parts, 1 represents an oil pipe or casing to which the tongs 2 are applied. The tongs comprise a yoke or bar 3, which is preferably slightly curved, as shown, and formed of parallel members or plates 4. The axis of this yoke is preferably disposed upon an arc having its center approximately at the center of the pipe to which the tongs are to be applied. The ends of the yoke are preferably enlarged, so as to form heads 5 and 6. At the head 6 a fixed handle or lever 7 is attached by means of a bolt 8 passing through the plates 4, as shown. In order to make this handle rigid with the yoke, the head 6 is provided on one side with a slot or recess 9, and a pin or cotter 10 is driven into an opening in the side of the lever, the said cotter lying in a recess, as shown in Fig. 1. At the head 5 a movable lever 11 is attached pivotally by means of a bolt 12, which passes through the plates 4, as shown. This lever is formed with a substantially circular head 13, which is provided at a suitable point with a tooth or dog 14, said dog preferably presenting an abrupt forward face 15 and an inclined rear face 16.

Preferably at substantially the middle point of the yoke 3 there is provided a jaw 17, which is pivotally attached upon a bolt 18, as shown. The body of this jaw is disposed between the plates 4, as indicated in Fig. 3. Its inner portion is formed into a plate or shoe 19, which is slightly curved, as shown, so as to conform to the curvature of the pipe, as indicated in Fig. 1. The inner face of this shoe is adapted to be applied to the side of the pipe to exert a frictional pressure thereupon. To increase its efficiency, it is preferably provided with teeth 20, which extend longitudinally or parallel with the axis of the pipe when the device is applied. These teeth 20 preferably incline in the direction in which the pipe is to be turned. This jaw 17 is formed with an outwardly-projecting toe or tail 21, the same being formed with oppositely-disposed forks 22, presenting a longitudinally-disposed slot 23 therebetween. The side edges of this slot 23 are preferably made with rabbets 24, formed in the forks, as shown most clearly in Fig. 3. In this way shoulders 25 are formed, as indicated most clearly in Fig. 1, the purpose of which will be described more fully hereinafter.

The tongs comprise also a chain 26, the same having the general construction of an ordinary sprocket-chain, comprising double links 27, connected by single links or bars 28. One extremity of this chain is formed into an anchor-link 29, which is a double link, the plates of which are connected at their free ends by a rivet 30, said rivet being enveloped by a collar or washer 31, which is disposed between the plates of the link, as indicated most clearly in Fig. 4. The space between the plates of this anchor-link is adapted to receive the dog 14, as indicated most clearly in Figs. 1 and 4. The body of the anchor-link is preferably curved, as shown, so as to conform substantially to the curvature of the head 13 of the lever 11. From this arrangement the anchor-link is adapted to be applied, as shown, with the chain passing around the body of the pipe. At a suitable point near the free end of the chain the same is thrust between the forks 22 of the tail 21. In this connection it should be stated that one of the bars 28 will be thrust into the slot 23 between the forks, so that the ends of the next double link will thrust against the shoulders 25.

With the parts disposed in this way and as illustrated in Fig. 1, the lever 11 will be forced to the right, so as its body will approach the pipe 1. In so doing a tensile force is exerted upon the chain, and its slack is taken up by the rotation of the dog 14, which occurs with the movement of the lever. The tension in the chain not only produces a firm pressure of the body of the chain against the side of the pipe, but it also operates to exert a force upon the jaw 17. This force tends, of course, to rotate the tail 21 toward the right as viewed in Fig. 1, and in this manner the shoe 19 of the jaw 17 is pressed firmly against the side of the pipe, as will be readily understood. From this arrangement the tension in the chain not only presses circumferentially upon the pipe, but produces a strong pressure at a point opposite the body of this chain. In this way a very efficient grasping of the pipe results, and a further movement of the lever 11 after the pipe is grasped will result in rotating the pipe in the desired direction.

Attention is called to the fact that the device is adapted for operation upon pipes of different diameters by reason of the fact that the tail 21 may be applied to the chain at any point on its length. I prefer to maintain the plates 4 of the yoke at a sufficient distance apart to enable the chain 26 to pass freely between them, as indicated in Fig. 1.

Having thus described my invention, I claim as new and desire to secure by Letters Patent—

1. A yoke, a jaw pivotally attached thereto, a chain engaging said jaw, and a lever pivotally attached to said yoke and engaging said chain.

2. In a chain tongs, in combination, a yoke, a jaw pivotally attached thereto and having a shoe adapted to engage the face of a pipe, said jaw further having a tail projecting therefrom, a chain adapted to engage said tail, and a lever pivotally attached to said yoke and having a dog adapted to engage said chain.

3. In a chain tongs, in combination, a yoke consisting of a pair of plates disposed apart, a jaw pivotally attached to said yoke between said plates and having a shoe adapted to engage the surface of a pipe, said jaw further having a tail projecting rearwardly therefrom, a chain adapted to engage said tail, and a lever pivoted to said yoke and having a dog adapted to engage said chain.

In testimony whereof I have signed my name to this specification in the presence of two subscribing witnesses.

HENRY R. HILL.

Witnesses:
C. O. DYE,
W. H. SMITH.